(12) United States Patent
Yancey et al.

(10) Patent No.: US 7,734,846 B2
(45) Date of Patent: Jun. 8, 2010

(54) DATAPIPE CPU REGISTER ARRAY

(75) Inventors: Jerry William Yancey, Rockwall, TX (US); Yea Zong Kuo, Rockwall, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 716 days.

(21) Appl. No.: 11/613,287

(22) Filed: Dec. 20, 2006

(65) Prior Publication Data

US 2008/0155138 A1 Jun. 26, 2008

(51) Int. Cl.
*G06F 13/12* (2006.01)
*G06F 13/38* (2006.01)
(52) U.S. Cl. .................. 710/51; 710/36; 710/38
(58) Field of Classification Search ............. 710/51
See application file for complete search history.

(56) References Cited

U.S. PATENT DOCUMENTS

| | | | |
|---|---|---|---|
| 4,447,881 A | 5/1984 | Brantingham et al. | |
| 5,081,575 A | 1/1992 | Hiller et al. | |
| 5,465,056 A | 11/1995 | Hsieh et al. | |
| 5,619,713 A | 4/1997 | Baum et al. | |
| 6,567,564 B1 | 5/2003 | van der Wal | |
| 6,684,268 B1 * | 1/2004 | Paluzzi | 710/33 |
| 6,883,084 B1 | 4/2005 | Donohoe | |
| 6,917,563 B2 * | 7/2005 | Lindstedt et al. | 365/189.02 |
| 7,047,464 B2 | 5/2006 | Bailis et al. | |
| 7,064,579 B2 | 6/2006 | Madurawe | |
| 7,076,595 B1 | 7/2006 | Dao et al. | |
| 7,454,532 B1 * | 11/2008 | Dickson, Richard | 710/20 |
| 2007/0076503 A1 * | 4/2007 | Rosen | 365/221 |

* cited by examiner

*Primary Examiner*—Niketa I Patel
*Assistant Examiner*—Zachary K Huson
(74) *Attorney, Agent, or Firm*—Hovey Williams LLP

(57) ABSTRACT

A system for data processing comprises a host circuit (104) and an integrated circuit (102), the host circuit (104) being external to the integrated circuit (102). The integrated circuit (102) includes a plurality of programming elements (300), each element (300) including a host interface (606) for receiving data and a first control signal from the host circuit (104), a control interface (604) for receiving a second control signal. Each element (300) includes a crosspoint switch (318), and a register array (628) for receiving and storing data from the crosspoint switch (318) according to the first and second control signals, for receiving and storing data from the host interface (606) according to the first and second control signals, and for communicating stored data to the crosspoint switch (318) according to the first and second control signals.

13 Claims, 8 Drawing Sheets

| PCPS x (PMEDS Stage x) | 0 | 1 |
|---|---|---|
| Sources | | |
| Stage x Input Signal | 0 | 1 |
| Stage x Interpolator | 0 | 1 |
| Stage x AU Output | 0 | 1 |
| Stage x Divider Output | 0 | |
| Stage x MAC Output | 0 | 1 |
| SP0 Read Port x | 0 | 1 |
| SP1 Read Port | | |
| Inter-Pair Input from Stage x | 1 | 0 |
| Stage x Ray 0, 1 Output | 0 | 1 |
| Stage x Constant | 0 | 1 |
| Destinations | | |
| Stage x AU Input 0 | 0 | 1 |
| Stage x AU Input 1 | 0 | 1 |
| Stage x Divider Input 0 | 0 | |
| Stage x Divider Input 1 | 0 | |
| Stage x MAC Input 0 | 0 | 1 |
| Stage x MAC Input 1 | 0 | 1 |
| SP0 Write Port x | 0 | 1 |
| SP1 Write Port x | | |
| Inter-Pair Output from Stage x | 1 | 0 |
| Stage x Ray 0, 1 Input | 0 | 1 |
| Stage x Output | 0 | 1 |

FIG. 5

| bit: | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|
| func | WPR | PP | IPDV | | | | | | | | | | | | | | | | | | | | | | | | |
| | | | | | | | | | | | | | | INPUT PORT | | | | | | | | | | | | | |

| FUNCTION: | DESCRIPTION: | NOTES: |
|---|---|---|
| PP | Ping-Pong Select Control | Selects which register bank is connected to the output and which is connected to the host register:<br><br>"0" – Host => Bank A; Bank B => RAY Output<br>"1" – Host => Bank B; Bank A => RAY Output |
| WPR | Write Pointer Reset Toggle | Writing a one shall cause the "Ping-Pong" mode Write Pointer to be reset to the initial register indicated by the control register. |
| IPDV | Input Port Data Valid | A one indicates that the next write value from the host is available at the host register. |
| INPUT PORT | Input Port Data | 24-Bit Two's Complement Data functions as the input port for host writes during Ping-Pong Mode. |

FIG. 7

| bit: | 31 30 29 28 27 26 25 24 | 23 22 21 20 19 18 17 16 | 15 14 13 12 11 10 9 8 | 7 6 5 4 | 3 2 | 1 0 |
|---|---|---|---|---|---|---|
| func | READ INTERVAL | READ DELAY | RANGE | INITIAL REGISTER | | MODE |

| FUNCTION: | DESCRIPTION: | NOTES: |
|---|---|---|
| MODE | Register Array Mode Control | Shall select the operational mode of the RAY:<br><br>000 – Idle (RAY not active)<br>001 – *Linked Datapipe Source*<br>010 – *Ping-Pong*<br>011 – *Incremental Readback*<br>(100 – 111) – Idle |
| RANGE | | Linked Datapipe Source Mode: 0 to 15 inclusive.<br>Ping-Pong Mode: *0 to 7 inclusive (8-15 => 7).*<br>Incremental Readback Mode: 0 to 15 inclusive.<br><br>Determines the number of registers used in an output read sequence:<br><br>"0" – 1 Register<br>"1" – 2 Registers<br>" " "<br>"15" – 16 Registers |
| READ DELAY | | 0 to 255 inclusive.<br>Determines the interval (in system clock periods) between the initiation of the read sequence and the first read cycle. ("0" shall indicate 256.) |
| READ INTERVAL | | 0 to 255 inclusive.<br>Determines the interval (in system clock periods) between reads. ("0" shall indicate 256.) |

FIG. 8

DATAPIPE CPU REGISTER ARRAY

RELATED APPLICATIONS

The present application is related to co-pending U.S. patent application titled "CPU DATAPIPE ARCHITECTURE WITH CROSSPOINT SWITCH," Ser. No. 11/322,487, filed Dec. 30, 2005. The identified earlier-filed application is hereby incorporated by reference into the present application.

BACKGROUND OF THE INVENTION

1. Field of the Invention

This invention relates generally to a central processing unit ("CPU") architecture. More particularly, this invention relates to a reconfigurable CPU within an Application Specific Integrated Circuit ("ASIC").

2. Description of Prior Art

Large-scale (multi-million gate) application specific integrated circuit ("ASIC") designs are hampered by many logistical problems. Many of these problems are related to the functional integration, timing, reprogramming and testing of various ASIC sub-modules. If sub-module design changes or replacements are required to remedy top-level operational issues, or to provide differing functional capabilities, costly delays and recursive design changes can result. Design changes of this nature drive up engineering, manufacturing and test costs for ASIC manufacturers, and limit the applicability of a given ASIC design.

Stated differently, ASIC designs typically have limited reconfigurability at the module or sub-module level, which is to say they may be programmable via control registers, but they typically use fixed architectures. These fixed architectures do not allow for functional modules to be re-arranged or reconfigured by a user. Certain ASICs, such as field programmable gate arrays ("FPGAs"), permit the user to reconfigure or reprogram functional modules, however, they are an extreme example which require a great deal of specialized programming and a special, fine-grained ASIC architecture to implement.

Within the current state of the art for ASIC design, manufacture, and test, there does not exist a processing unit or means for efficiently and quickly reprogramming functional modules. Hence there is a need for an advanced ASIC processing architecture to address one or more of the drawbacks identified above.

SUMMARY OF THE INVENTION

An improved datapipe CPU register array is part of a programmable element of an integrated circuit that is in communication with a host that is external to the integrated circuit. The integrated circuit includes a plurality of programming elements, each element including a host interface for receiving data and a first control signal from the host circuit, and a control interface for receiving a second control signal. Each element includes a crosspoint switch, and a register array for receiving and storing data from the crosspoint switch according to the first and second control signals, for receiving and storing data from the host interface according to the first and second control signals, and for communicating stored data to the crosspoint switch according to the first and second control signals.

These and other important aspects of the present invention are described more fully in the detailed description below.

BRIEF DESCRIPTION OF THE DRAWINGS

An embodiment of the present invention is described in detail below with reference to the attached drawing figures, wherein:

FIG. 5 is a matrix of crosspoint switch sources and destinations;

FIG. 7 is a table of exemplary bit assignments of a host register of the register array of FIG. 6; and FIG. 8 is a table of exemplary bit assignments of a control register of the register array of FIG. 6.

DETAILED DESCRIPTION

Before proceeding with the detailed description, it should be noted that the present teaching is by way of example, not by limitation. The concepts herein are not limited to use or application with one specific type of central processing architecture. Thus, although the instrumentalities described herein are for the convenience of explanation, shown and described with respect to exemplary embodiments, the principles herein may be equally applied in other types of central processing architectures.

Figure 1:
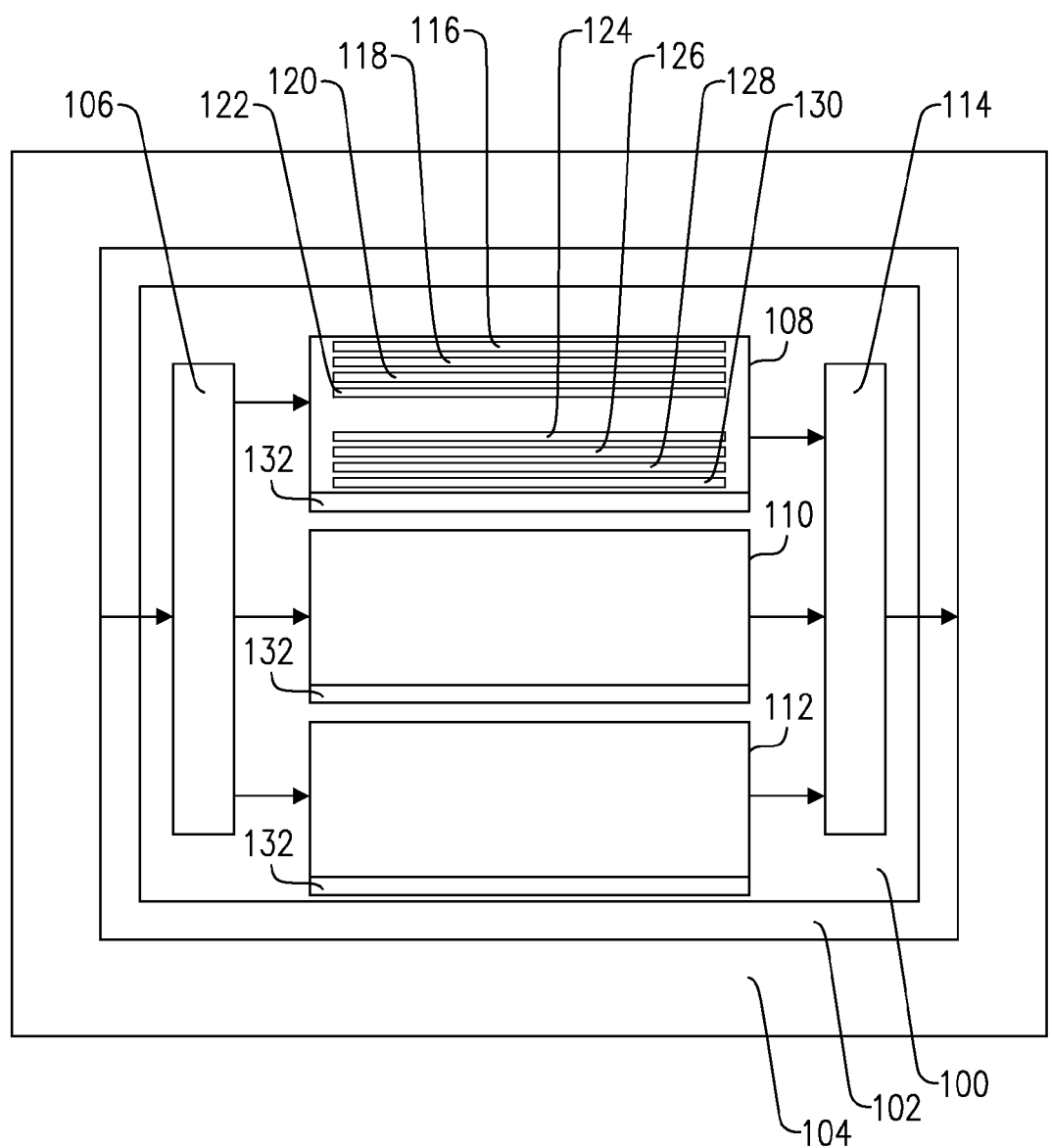
FIG. 1 is a plan view of a processing unit having a plurality of integrated programmable elements.

FIG. 1 is a plan view of a reconfigurable processing unit 100 for an application specific integrated circuit ("ASIC") 102. In at least one embodiment, the processing unit is a central processing unit ("CPU"). As shown, ASIC 102 interfaces with, and is an integral element of, a host device or host 104, which may also be a subsystem or system. A host interface or input interconnect 106 links the ASIC to the host device 104 for the purpose of transmitting data signals to ASIC 102. In one embodiment, the host interface is a switch which may be a crosspoint switch.

Processing unit 100 includes a plurality of programmable elements, of which elements 108, 110 and 112 are exemplary. In one embodiment, elements 108-112 primarily perform matrix operations or matrix-intensive mathematical algorithms. As such, these elements may be referred to as programmable matrix elements or "PMEs." The input and output protocol for each PME 108-112 is a standard input/output ("I/O") format for digital signal processing. In particular, as discussed in greater detail below, the input may be either a "0" or a "1," as per a standard digital signal scheme. Further, one standard output is transmitted from each PME 108-112 to a host output interconnect 114, which may also be a crosspoint switch.

Each PME, e.g. PME 108, may include eight two-stage processing modules or PME dual-stage subchips ("PMEDs"), of which PMEDs 116, 118, 120, 122, 124, 126, 128 and 130 are exemplary. Further, each PME 108-112 includes a multiplicity of bundled functions to include Reset/Enable, Host, Output Formatter, and SP0/SP1 multiplexing functions housed within a single module, which may be designated "PME Other" (reference numeral 210, FIG. 2).

PMEs 108-112 are reconfigurable, which is to say each may be programmed or reprogrammed to perform one or more processing functions related to matrix operations. Each PME 108-112 may be programmed to function independently or in conjunction with other PMEs. Also, functions within each PME 108-112 may be performed in parallel, without many of the limitations of serial data processing. In particular, serial processing or functioning may be used exclusively to monitor and control processes, as opposed to impacting data transfer and flow. As such, processing unit 100 is a flexible processor capable of being operated as one large parallel processor, multiple parallel processors, or as a number of independent processors.

PMEs 108-112 are clocked using a System Clock (not shown). In one embodiment, clock rates up 62.5 MHz shall be accepted, however, it can be appreciated that various clock rates may also be used without departing from the scope of this disclosure. Also, each PME 108-112 can be reset and/or enabled/disabled using a PME level reset or enable control bit respectively. Operationally, the response to the assertion of a "disabled" state for a given PME 108-112 shall be functionally identical to the assertion of the PME "reset" state, with the exception that no internal host modules shall be affected.

Figure 2:
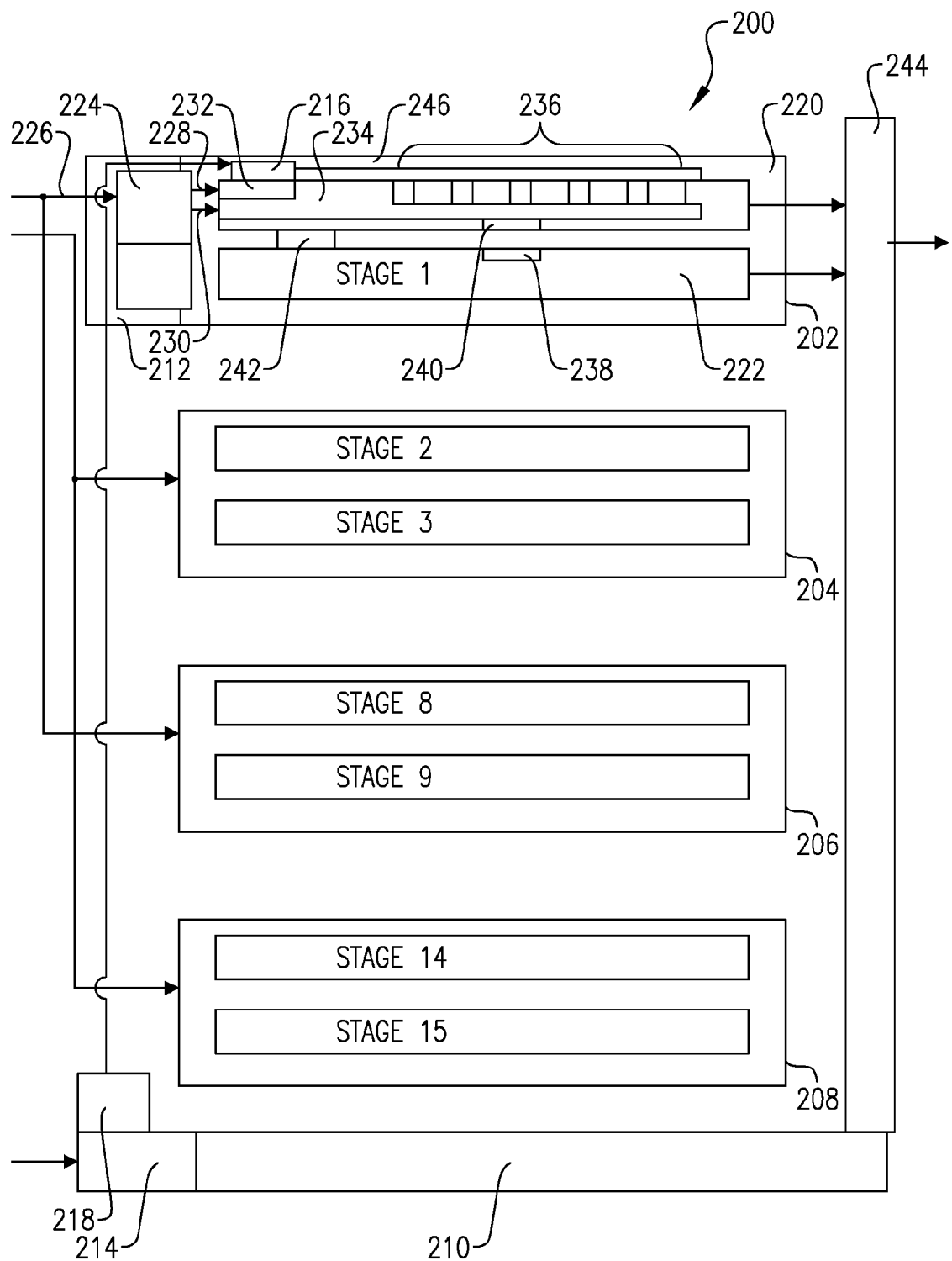
FIG. 2 is a plan view a programmable element.

Referring now to FIG. 2, a somewhat more detailed examination of a programmable element, i.e. PME 200, is disclosed. Although a general overview of a PME 200 and two-stage PMED 202 is provided in FIG. 2, as part of the overall architecture of element 200, a more detailed description of a two-stage PMED is discussed with regard to FIG. 3. The circuitry interconnecting the various components of PME 200 has been simplified to facilitate discussion and explanation. It can be appreciated by those skilled in the art that standard integrated circuit inputs and outputs, as well as circuit interconnects, synchronization and clock signals, etc, are integral to PME 200, and are therefore incorporated into the present disclosure. Only those standard features necessary to understand the disclosed invention are included in the associated figures.

As shown and discussed above, PME 200 includes a plurality of multi-stage processing modules or PMEDs, of which PMEDs 202, 204, 206 and 208 are exemplary. In a PME having eight such modules, PMEDs 202-208 represent one-half of the PMED set of eight. Each stage of each PMED, as well as the PME Other module 210, includes a separate Host Interface, such as host interface 212 (PMED 202 host interface) and interface 214 (PME Other 210 host interface). The PMED host interface modules, e.g. module 210, provides control registers, memory access, and interrupt management functions for each stage.

Similar to each PME, e.g. PME 200, each PMED 202-208 includes a PMED reset and PMED enable/disable function. Through the reset/enable registers, for example register 216, each PMED may be independently reset and enabled/disabled. PMED reset/enable register 216 is interconnected to a PME reset/enable register, e.g. register 218. Additionally, each stage of each PMED may be independently reset or enabled/disabled through a stage reset/enable register (not shown).

In at least one embodiment, each PMED 202-208 is a two-stage module, for example Stage 0 220 and Stage 1 222 in PMED 202. Numbering of stages may be by convention well known in the art. For example, the remaining stages of FIG. 2 may be identified as stages 2 and 3 (PMED 204), stages 8 and 9 (PMED 206) and stages 14 and 15 (PMED 208). Of note, each PMED 202-208 has an "even" and an "odd" numbered stage for each stage "pair," which is used to facilitate the transfer and processing of input signals. Given that FIG. 2 represents one-half of an eight-stage PME, other stage pairs not represented may be numbered, for example, (4,5), (6,7), (10,11), (12,13).

Each stage of a PMED, e.g. Stage 0 220 and Stage 1 222 of module 202, is interconnected to a stage signal input formatter, such as input formatter 224. Each stage input formatter is structured and arranged to demultiplex a standard input signal 226 into two discrete signals streams or input signals, e.g. signals 228 and 230. Signals 228 and 230 are communicated within Stage 0 220 to an interpolation module 232 and a crosspoint switch 234 respectively.

Interconnected to crosspoint switch 234 are a series of signal manipulation modules 236 for performing certain designated matrix/mathematical functions and/or data control/transfer on data integral to and derived from input signal 226. As described in greater detail below, functions include addition, subtraction, division, etc. of real and complex numbers. Further, each stage includes Type "0" generic RAM modules (e.g. modules 238 and 240), and a Type "1" generic RAM modules, e.g. module 242. Also, PME 200 includes a PME Output formatter 244 interconnected to each stage (e.g. Stage 0 220), and a PME Programmable Control Module ("PGCM") 246.

Figure 3:
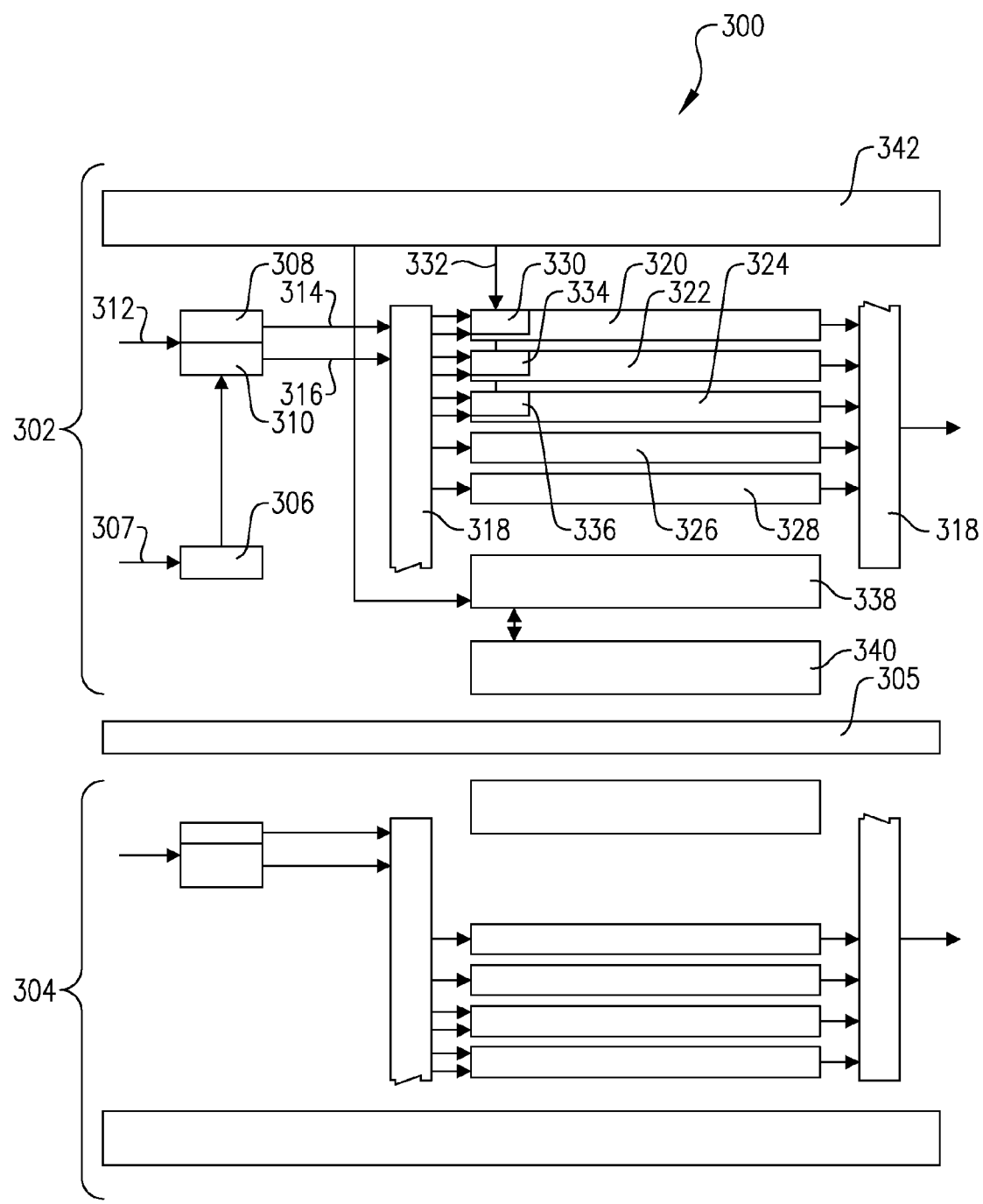
FIG. 3 is a plan view of multi-stage signal processing unit.

Considering now FIG. 3, a more detailed examination of a PMED 300 is presented. As shown, each PMED 300 includes two stages, for example a Stage 0 302 and a Stage 1 304, as well as a host interface 305. In a PME having eight two-stage PMEDS, each stage 1-15 is capable of performing substantially the same functions. One stage, typically identified by convention as Stage 0 302, includes additional functional capability. More specifically, in addition to the input formatting, interpolation, addition, subtraction, multiplication, accumulation, storage and scaling of both complex and real numbers provided by stages 1 through 15, Stage 0 302 includes a complex/real number division function.

A stage reset/enable register 306 (Stage 0 302) may receive a control signal or command 307 from the PMEDs reset/enable manager (e.g. register 216 FIG. 2) to reset, enable or disable Stage 0. Reset/enable register 306 has the capability to reset, enable or disable Stage 0 302 independent of any reset, enable or disable function performed on any other stage, e.g. Stage 1 304. After reset, a stage is left in a "disabled" state and all related programming registers assume their default values. The same may be said for the assertion of a "disable" command from register 306, with the exception that the corresponding PMEDs Host Interface Module 305 is not affected by the stage "disable" command. When a stage such as Stage 0 302 is enabled, the corresponding PMEDs host interface provides for a readback of the stage enable status.

Within each stage, an input formatter 308 and stage interpolation module 310 receive a single input signal 312 and output two (18,18) signals 314 and 316 respectively to a stage crosspoint switch module ("PCPS") 318. Stage input formatter 308 has the capability to route a "data valid" signal from each channel in a standard multiplexed input signal 312 to any of the signal streams being created by within a PME (e.g. PME 200 FIG. 2). Upon receipt of a "data valid" signal derived from the multiplexed input signal 312, the stage shall reset/enable stage input formatter 308 via enable/reset register 306.

As discussed briefly above, each PME/PMED/Stage may receive both input signal "0" and an input signal "1." Stage interpolation module 310 provides input interpolation for each stage input signal "1." The output is an "interpolated" signal "0." In particular, interpolation is accomplished by inserting an indicated number of "zeroes" after each input signal "1" sample received. The number of "zeroes" inserted is controlled by an interpolation field of an interpolation control register within stage interpolation module 310. If an indicated interpolation produces a sample rate exceeding the System Clock rate, an "interpolator error" interrupt signal is generated.

The outputs 314, 316 of the Stage 0 302 input formatter 308 and stage interpolation module 310 are directed toward the stage crosspoint switch module 318. As an integral part of the present disclosure, PCPS 318 interconnects the signal processing resources within Stage 0 302. As shown in FIG. 3, the specific resources include: an arithmetic unit module ("AU") 320; a divider module 322; a multiply/accumulate module ("MAC") 324; and two register array modules ("RAY"), i.e. RAY "0" 326 and Ray "1" 328.

In at least one embodiment, AU module 320 accepts two (24, 24) standard inputs (typically represented as Input 0 and Input 1) from PCPS 318, and provides one (24,24) standard output to PCPS 318. A "sample hold" function 330 within AU module 320 receives a single control bit from a PCPS control bus 332 to determine its mode of operation. In a "normal" hold mode, an AU module 320 operation may only be performed when valid values are present at both inputs (i.e. Input 0 and Input 1). Values received at each input may be held until they are used in an AU operation and then released. Sample hold function 330 is capable of accepting values at the System Clock rate. If a new value is received on the same input before an AU operation occurs, the old value is overwritten. An "AU Hold Error" interrupt is generated for this condition. In a "latched" hold mode, sample hold function 330 may latch the next valid value received, and hold the value until the mode of AU module 320 is changed. AU operations occur any time both inputs to the module are valid.

AU module 320 may be capable of performing complex addition and subtraction operations at System Clock rates. For addition, an Output=Input 0+Input 1. Alternatively, for subtraction, an Output=Input 0−Input 1. AU module 320 receives a single control bit to determine whether the module adds or subtracts. AU module 320 is capable of switching modes at System Clock rate. If a numeric overflow occurs, an "AU Overflow Error" interrupt may be generated.

As noted above, only one stage (e.g. Stage 0) includes a complex/real number Divider module 322. Divider module 322 accepts two (24, 24) standard inputs (typically represented as Input 0 and Input 1) from PCPS 318, and provides one (24,24) standard output to PCPS 318. A "sample hold" function 334 within Divider module 322 receives a single control bit from a PCPS control bus 332 to determine its mode of operation. In a "normal" hold mode, a Divider module 322 operation may only be performed when valid values are present at both inputs (i.e. Input 0 and Input 1). Values received at each input may be held until they are used in a Divider operation and then released. Sample hold function 334 is capable of accepting values at the System Clock rate. If a new value is received on the same input before a Divider operation occurs, the old value is overwritten. A "Divider Hold Error" interrupt is generated for this condition. In a "latched" hold mode, sample hold function 334 may latch the next valid value received, and hold the value until the mode of Divider module 322 is changed. Divider operations occur any time both inputs to the module are valid. Divider module 322 may be capable of performing complex/real division operations at System Clock rates, and may be capable of switching modes at System Clock rate as well.

In addition to an AU module 320 and Divider module 322, each stage may include a MAC module 324. MAC module 324 typically includes multiplier, accumulator and output scaler modules (not shown). MAC module 324 accepts two (24,24) standard inputs from PCPS 318 and provides one standard (24,24) output to PCPS 318. MAC module 324 is capable of both real and complex number multiplication. A "sample hold" function 336 within MAC module 324 receives a single control bit from a PCPS control bus 332 to determine its mode of operation. In a "normal" hold mode, a MAC module 324 operation may only be performed when valid values are present at both inputs (i.e. Input 0 and Input 1). Values received at each input may be held until they are used in an AU operation and then released. Sample hold function 336 is capable of accepting values at the System Clock rate. If a new value is received on the same input before a MAC operation occurs, the old value is overwritten. A "MAC Hold Error" interrupt is generated for this condition. In a "latched" hold mode, sample hold function 336 may latch the next valid value received, and hold the value until the mode of MAC module 324 is changed. MAC operations occur any time both inputs to the module are valid.

The multiplier module within MAC module 324 may have four modes of operation: Single Real; Dual Real; Complex; and Complex Conjugate. The multiplier module within MAC module 324 receives two "Mode Control" bits to determine its mode of operation. As with other elements of the present disclosure, the multiplier module is capable of switching mode at System Clock rates. Of note, if a multiplication operation is "in process," the operation will complete prior to a mode change.

The Accumulator module (not shown) within MAC module 324 is capable of performing complex addition at the System Clock rate. The accumulator function can automatically add together a programmed number of complex MAC Adder inputs, output the sum, and then clear the accumulation sum. Three modes of accumulation include: single accumulation; multiple accumulation; and adder bypass. Single accumulation mode zeros the accumulation sum, adds together a predetermined number of MAC 324 multiplication products, and then outputs the accumulation sum. The multiple accumulation mode maintains four independent single accumulations by demultiplexing four adjacent input values. Further, adder bypass mode forces a zero on an adder input used for an accumulation feedback path, thereby causing the MAC Adder function to be bypassed.

Programmable scaling of MAC module 324 output is achieved via a MAC scaler output module (not shown). Scaling is accomplished via a barrel shift function. The amount of scaling is controlled, and all outputs are rounded to 24-bits. The output scaler module is capable of operating at the System Clock rate.

Still referring to FIG. 3, each PMEDs stage may provide two Register Array ("RAY") modules designated modules "0" and "1," e.g. modules 326 and 328 respectively. Each RAY module 326, 328 accepts one standard (24,24) input from PCPS 318 and provides one (24,24) standard output to PCPS 318. Further, each RAY module 326, 328 contains sixteen (24,24) registers. Three separate modes of operation are possible, including: "linked datapipe source"; "ping-pong", and "incremental feedback" modes.

Figure 6:
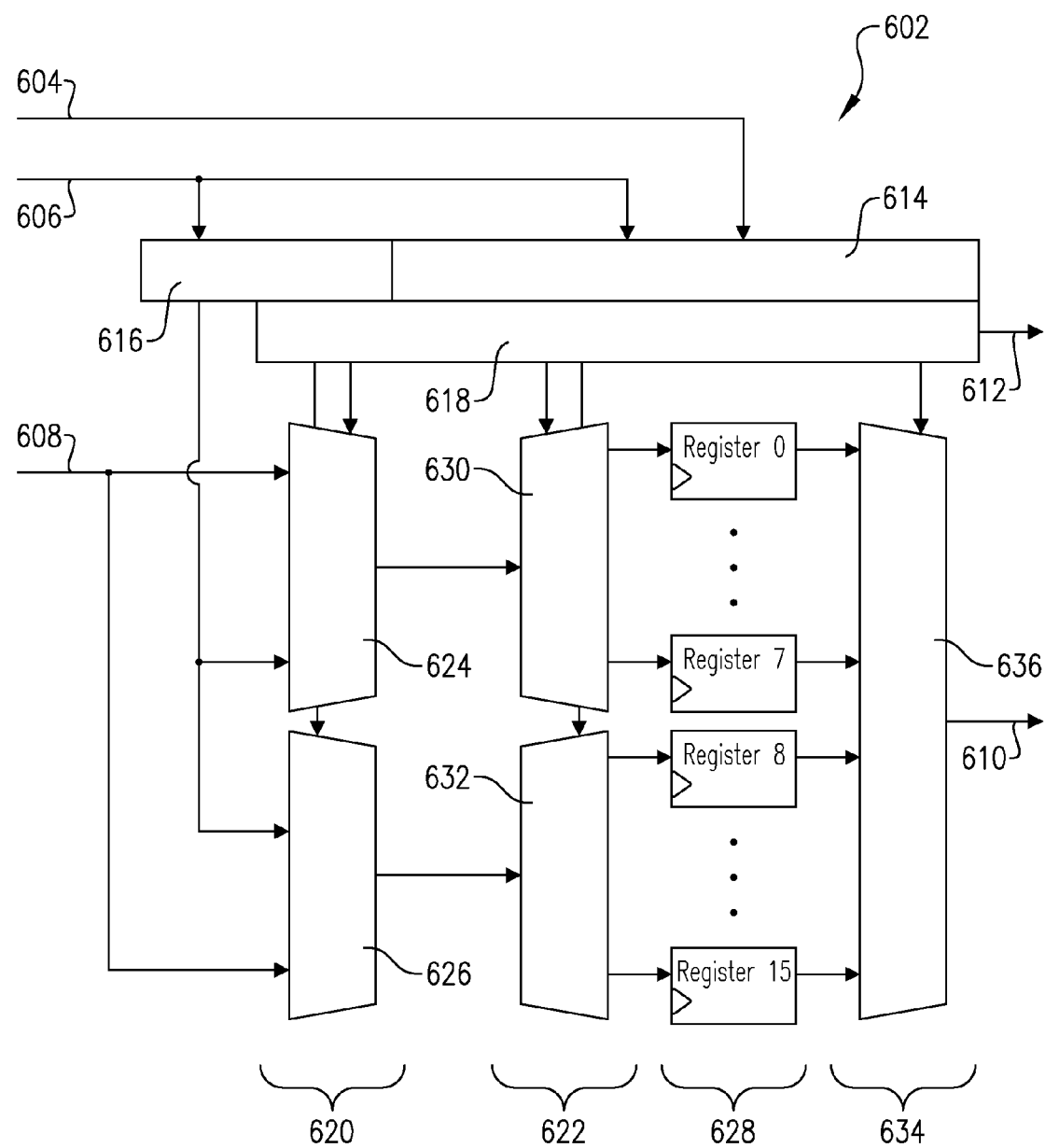
FIG. 6 is a schematic diagram of an exemplary register array circuit of the multi-stage signal processing unit of FIG. 3.

An exemplary circuit 602 for implementing each of the RAY modules 326, 328 is illustrated in FIG. 6. The circuit 602 includes one or more inputs and one or more outputs, and the illustrated implementation specifically includes three inputs 604, 606, 608 and two outputs 610, 612. A control bus input 604 receives a signal from the PCPS control bus 332 and communicates the signal to a control register 614. A host input 606 receives a signal from the host 104 and communicates the signal to a host register 616 and to the control register 614. A PCPS input 608 receives data from the PCPS 318.

The circuit 602 is controlled by a control module 618. The control module 618 controls various aspects of the circuit 602 according to the value of bits in the control register 614 and the host register 616. Both the host 104 and a programmable PME control module 342 ("PGCM")—described in greater detail below—have access to the control register 614. Upon reset, the control register 614 defaults to host control, and the PGCM has the ability to override host control of the control register 614 by loading data to the control register 614. The host can write data to the RAY 326,328 via the host register 616.

The PCPS input 608 and the host register 616 are each in communication with a first stage 620 of logic, wherein the first stage 620 presents a plurality of stage inputs and a plurality of stage outputs and selectively communicates data from one or more of the inputs to one or more of the outputs. The illustrated circuit 602 communicates data from either the PCPS input 608 or the host register 616 to a second stage 622 of logic. The illustrated first stage 620 includes a first multiplexer 624 and a second multiplexer 626, wherein each of the first and second multiplexers 624,626 has multiple data inputs and a single data output. The illustrated multiplexers 624,626, for example, each have two data inputs and one data output, commonly referred to as a two-to-one (2:1) multiplexer. Each of the first and second multiplexers 624,626 is able to selectively communicate data received from one of the PCPS input 608 and the host register 616 to an output thereof. The output of each of the first multiplexer 624 and second multiplexer 626 is communicated to the second stage 622.

The second stage 622 selectively communicates each of the outputs of the first stage 620 to one or more of the data storage registers 628. Specifically, the second stage 622 includes a third multiplexer 630 and a fourth multiplexer 632, wherein the third multiplexer 630 communicates the output of the first multiplexer 624 to one or more of a plurality of the data storage registers 628, and the fourth multiplexer 632 communicates the output of the second multiplexer 626 to one or more of a plurality of the data storage registers 628. Thus, each of the third and fourth multiplexers 630,632 may have a single data input and a plurality of data outputs. The illustrated multiplexers 630,632 are each one-to-eight (1:8) multiplexers operable to communicate input data to one of eight data registers.

The array of data registers 628 may be functionally divided into a plurality of banks, such as two banks, a first bank including registers 0-7 and a second bank including registers 8-15.

A third stage 634 of logic selectively communicates an output of one of the data registers 628 to the PCPS output 610. In the illustrated circuit 602, each register output is connected to an input of a fifth multiplexer 636, the fifth multiplexer 636 being a sixteen-to-one (16:1) multiplexer. The output of the fifth multiplexer 636 is connected to the PCPS output 610, which is connected to the PCPS 318.

The first 624, second 626, third 630, fourth 632, and fifth 636 multiplexers are each controlled by the control module 618, which functions according to the values stored in the host register 616 and the control register 614, as explained above. The control module 618 also asserts an error output 612. FIG. 7 presents a table illustrating an exemplary bit assignment for a plurality of bits of the host register 616. In the exemplary implementation illustrated in FIG. 7, the host register 616 holds twenty-seven bits of data, including input port bits 0-23, ping-pong selection control ("PP") bit 24, input port data valid bit ("IPDV") 25, and write pointer reset toggle ("WPR") bit 26. The functions associated with these bits are described in greater detail below.

In the exemplary implementation illustrated in FIG. 8, the control register 614 holds thirty-two bits of data, including mode bits 0-2, unused bits 3-6, range bits 7-10, read delay bits 11-23, and read interval bits 24-31. The functions associated with these bits are described in greater detail below. The control register 614, host register 616, and control module 618 together form a control circuit that stores control signals from the control input 604 and the host input 606 and controls operation of the circuit 602 according to the stored control signals.

As explained above, each RAY 326,328 may operate in any of three separate modes of operation, including: "linked datapipe source"; "ping-pong", and "incremental feedback" modes. The mode bits of the control register 614 determine which of these three modes the RAY is operating in, as illustrated in the table of FIG. 8.

When operating in the "linked datapipe source" mode, the circuit 602 receives a burst of input data at a first data rate (e.g., the system clock rate) and communicates the data to the PCPS 318 at a second data rate. The circuit 602 may also hold the data for a predetermined delay period before communicating it. This mode of operation is useful, for example, when a burst of input data received at the system clock rate must be temporarily held or delayed so that it can be communicated to a module which cannot accept data at the clock rate. Each successive input is written into one of the data registers 628 at the rate received, for example, at the system clock rate. Data is written to the register array 628 according to the state of control bits in the control register 614. More particularly, the circuit 602 will write incoming data to the register array 628 according to the "initial register" and "range" fields of the control register 614. An output read sequence may be initiated each time the initial register is written to. The circuit 602 will read and output the data stored in the data registers 628 according to the "read delay," "read interval," "initial register," and "range" fields of the control register 614. If data in a register is overwritten before it is output, or if the read sequence cannot complete in a timely manner due to a lack of data input, the controller asserts the interrupt output to generate a RAY error interrupt on the error output 612.

In the "ping-pong mode" of operation, the host 104 is able to write data to a first one or more of the data registers 628 while the data contained in a second one or more of the data registers 628 is simultaneously read to the PCPS 318. More particularly, the data registers of the circuit 602 are divided into two register banks, referred to herein as bank "A" and bank "B." In the illustrated circuit 602 there are sixteen data registers 628, therefore each of bank A and bank B will include eight registers. Bank A includes registers 0-7 and is associated with the third multiplexer 630, while bank B includes registers 8-15 and is associated with the fourth multiplexer 632. The host 104 writes data to a first bank via the host input 606 and the host register 616 while the other register bank is writing data to the PCPS output 610. It will be appreciated that these read and write operations are performed simultaneously.

As illustrated in FIG. 7, the state of the ping-pong select control bit of the host register determines whether the host is writing to bank A or bank B. If the host is writing data to the registers of bank A, data stored in the registers of bank B is communicated to the PCPS output 610. If the host is writing data to the registers of bank B, data from the registers of bank A is communicated to the PCPS output 610. The number of registers used in an output read sequence is determined by the range bits of the control register 614. A single register or multiple registers may be read, up to eight registers. Typically, relative addressing of registers as "0" to "7" in each bank is maintained. Read sequences that are in progress when the "ping-pong" control bit is changed are completed before the register bank is switched. Further, switching register banks may cause both read and write pointers to be reset. The state of the IPDV bit of the host register 616 determines whether the next valid data is available in the input port bits of the host register 616.

In the "incremental feedback" mode of operation, the circuit 602 accepts a series of inputs, typically separated by an interval of time, such as five clock cycles, ten cycles, one hundred clock cycles, one millisecond, and so forth. Each successive input is written to one of the data registers 628. Each time an input is written to one of the data registers 628, all of the inputs that have been received to that point are read as a single sequence. More particularly, a "cumulative" read buffer is maintained such that every input since the beginning of a write sequence is communicated to the PCPS 318, in the order received, in response to each write.

As shown in FIG. 3, each PMED 300 may include two Type 0 Generic RAM modules ("GRM0"), e.g., module 338 for Stage 0 302. The PME Other module (210 FIG. 2) interconnects the sixteen GRM0 modules present in a given PME 200 to provide a Scratchpad RAM 0 (SP0) function. In a given PMED 300, the SP0 function provides a standard (24,24) interface to/from each of sixteen PCPSs (e.g., PCPS 318). Via SP0 write ports (not shown), any PCPS 318 can supply data to any GRM0 338, and alternatively, any GRM0 338 can supply data to any PCPS 318 via a SP0 read port (not shown). In at least one embodiment, each GRM0 module, e.g., module 338, includes eight operational modes, i.e. Host; RCB; Normal Datapipe Source; Signal Triggered Datapipe Source; Datapipe Destination; Extended Precision Datapipe Destination; Type 1 FIR Filter ISM; and Type 2 FIR Filter ISM.

Still referring to FIG. 3, each PMED 300 may include a Type 1 Generic RAM module ("GRM1") 340. The PME Other module (210 FIG. 2) interconnects the eight GRM1 modules present in a given PME 200 to provide a Scratchpad RAM 1 (SP1) function. In a given PMED 300, the SP1 function provides a standard (24,24) interface to/from each of sixteen PCPSs (e.g. PCPS 318). Via SP1 write ports (not shown), any PCPS 318 can supply data to any GRM1 340, and alternatively, any GRM1 340 can supply data to any PCPS 318 via a SP1 read port (not shown). In at least one embodiment, each GRM1 module, e.g. module 340, includes eight operational modes, i.e. Host; RCB; Normal Datapipe Source; Signal Triggered Datapipe Source; Datapipe Destination; Extended Precision Datapipe Destination; Type 1 FIR Filter ISM; and Type 2 FIR Filter Coefficient Address Generator. To allow multi-stage operation, each GRM1 340 is able to transfer data to/from any SP1 port. Also, each GRM1 340 is provided to both stages in a given PMED 300.

As noted above, each PMED 300 includes a Programmable PME Control Module ("PGCM") 342 (Stage 0 302). The function of each PME stage is programmed and controlled by the Host (not shown) via a RAM-based finite state machine which is the PGCM 342. Each PGCM 342 has the ability to execute a user-supplied program at the System Clock rate. Further, each PGCM 342 provides a program storage capacity of 512 instructions. The PGCM 342 program supports a given signal processing function by controlling the arithmetic, storage and signal routing assets of it's the associated stage. Each PGCM 342 can operate independently to control single-stage functions, or it may operate in conjunction with other stages to make multi-stage functions.

Figure 4:
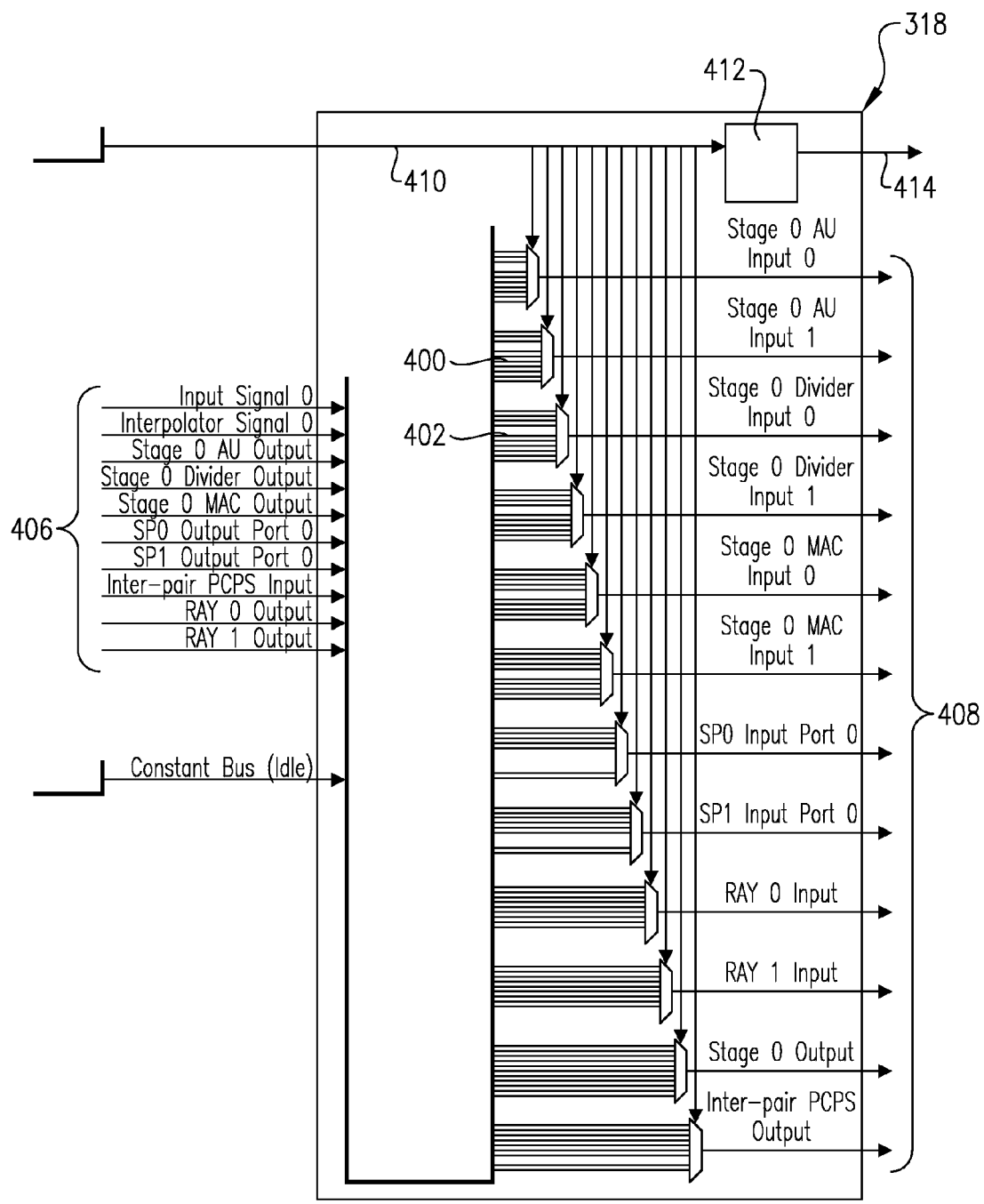
FIG. 4 is a block diagram of a crosspoint switch.

Cross-referencing for a moment FIG. 3 with FIG. 4, typical connections for PCPS 318 are presented. As can be appreciated by referring to FIGS. 3 and 4, PCPS 318 is not multiplexed, which is to say signal streams are passed directly between stage resources. Crosspoint switch 318 may be programmed to interconnect arithmetic elements (e.g. AU module 320, MAC module 324) in "datapipe" fashion. A PGCM 342 "shepherds" the data flow process without directly interfering with data transfers affected by crosspoint switch 318.

As shown in FIG. 4, a specified number of parallel data pathways, or "datapipes" are available for the transfer of data, of which pathways 400 and 402 are exemplary. Representative input signals 406 are routed via datapipes (e.g., 400 and 402) to any one of several signal output locations 408. During operation, each destination or data pathway in PCPS 318 shall have its source selected by 4-bits from the PCPS control bus 410, which in turn is provided by the associated PGCM, e.g. PGCM 342 in FIG. 3. If an indicated connection is not valid (block 412 in FIG. 4), an "Invalid PCPS Connection Error" interrupt will be generated 414. In at least one embodiment, PCPS 318 is capable of switching connections at the System Clock (not shown) rate.

Typically, pathways 400, 402 in PCPS 318 carry a 24-bit in-phase word and a 24-bit quadrature word (24,24). PCPS 318 interconnections where the source and destination have the same bit width are mapped bit-to-bit. Alternatively, PCPS 318 interconnections where the source and destination have a different bit width are mapped as follows: (a) 18-bit sources are sign-extended into the LS bits of internal 24-bit PCPS 318 destinations thereby allowing for maximum growth for subsequent manipulations of 18-bit numbers; (b) 18-bit sources connected to a 24-bit output formatter destination are optionally mapped MS-bit to MS-bit, with any extra bits zero-filled, such that a given input value will produce the same output value if a direct connect is used; (c) certain modules, such as the MAC 324 and Divider 322 modules, having internal bit resolution greater than 24-bits, may have output scaler functions which allow the "best" 24-bits to be selected for output in a given functional application; and, similarly, (d) AU module 320 has an output scaler function which allows an 18-bit output to result from either the MS or LS part of a 24-bit word. For all other 24-bit sources it may be assumed that the "best" 18-bits are the MS bits of the 24.

Interconnection options within PCPS 318 may be controlled and/or restricted to minimize hardware requirements. For example, stage "input" and "interpolation" sources may be available to all destinations (modules, etc.) within a given stage. Similarly, stage "outputs" may have all sources within the same stage available to it. Referring for a moment to FIG. 5, a sample stage-by-stage summary of valid PCPS sources and destinations for at least one embodiment of the present disclosure is presented. In FIG. 5, the numbers (i.e. "0" and "1") in the stage columns labeled "0" and "1" 500 are used in place of the "x" variable for each source and destination. For example, "Stage x Input Signal" for Stage "0" (indicated by arrow 502) would be "Stage '0' Input Signal." Alternatively, "Inter-pair Input from Stage x" for Stage "0" (indicated by arrow 504) would be "Inter-pair Input Stage 1."

As shown in FIG. 5, there may be several asymmetries in the resource allocations for various stages. For example, in at least one embodiment Stage 0 is the only stage to include a stage divider module, therefore there can be no Stage 1 Divider Output source, nor can there be a Stage 1 Divider Input 0 or Input 1. Also, inter-pair connections may only be cross-linked between the stages of each pair of stages. Further, although each stage in a pair may drive an SP1 Write Port (as shown in FIG. 5), only one stage in each pair may actually write to the PMED RAM at any one time. By contrast, both stages of a pair (e.g., Stage 0 and Stage 1) may receive the same SP1 Read Port simultaneously.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

Having thus described a preferred embodiment of the invention, what is claimed as new and desired to be protected by Letters Patent includes the following:

1. A programmable element for data processing comprising:
    a host interface for receiving data and a first control signal from a host;
    a control interface for receiving a second control signal;
    a crosspoint switch;
    an array of data registers including a first bank comprising a first plurality of registers and a second bank comprising a second plurality of registers;
    a first multiplexer for receiving first data from the host interface and second data from the crosspoint switch, and for communicating one of the first data or the second data to an output of the first multiplexer according to the control signal;
    a second multiplexer for receiving the first data from the host interface and the second data from the crosspoint switch, and for communicating one of the first data or the second data to an output of the second multiplexer according to the control signal;
    a third multiplexer for communicating the output of the first multiplexer to a register in the first bank of registers according to the control signal; and
    a fourth multiplexer for communicating the output of the second multiplexer to a register in the second bank of registers according to the control signal.

2. The programmable element of claim 1, the register array including an array of sixteen data registers.

3. The programmable element of claim 1, further comprising a control circuit for receiving and storing the first and second control signals, controlling operation of the register array according to the first and second control signals, and for generating an error signal upon the occurrence of a predetermined error condition.

4. The programmable element of claim 1, further comprising a fifth multiplexer for communicating data from one of the plurality of data registers to the crosspoint switch according to the first and second control signals.

5. A system for data processing comprising:
    a host circuit; and
    an integrated circuit in communication with the host circuit, the host circuit being external to the integrated circuit, the integrated circuit including a plurality of programmable elements for data processing, each programmable element including—
        a host interface for receiving data and a first control signal from the host circuit,
        a control interface for receiving a second control signal,
        a crosspoint switch,
        an array of data registers including a first bank comprising a first plurality of registers and a second bank comprising a second plurality of registers,
        a first multiplexer for receiving first data from the host interface and second data from the crosspoint switch, and for communicating one of the first data or the second data to an output of the first multiplexer according to the control signal,
        a second multiplexer for receiving the first data from the host interface and the second data from the crosspoint switch, and for communicating one of the first data or the second data to an output of the second multiplexer according to the control signal,
        a third multiplexer for communicating the output of the first multiplexer to a register in the first bank of registers according to the control signal, and
        a fourth multiplexer for communicating the output of the second multiplexer to a register in the second bank of registers according to the control signal.

6. The system of claim 5, the register array including an array of sixteen data registers.

7. The system of claim 5, further comprising a control circuit for receiving and storing the first and second control signals, controlling operation of the register array according to the first and second control signals, and for generating an error signal upon the occurrence of a predetermined error condition.

8. The system of claim 5, further comprising a fifth multiplexer for communicating data from one of the plurality of data registers to the crosspoint switch according to the first and second control signals.

9. A programmable register array circuit comprising:
    an array of data registers comprising a plurality of data registers for storing data;
    a first interface for receiving data;
    a second interface for receiving data;
    a control interface for receiving a control signal;
    a first multiplexer for receiving first data from the first interface and second data from the second interface, and for communicating one of the first data or the second data to an output of the first multiplexer according to the control signal;
    a second multiplexer for receiving the first data from the first interface and the second data from the second interface, and for communicating one of the first data or the second data to an output of the second multiplexer according to the control signal;
    a third multiplexer for communicating the output of the first multiplexer to a first one of the plurality of data registers according to the control signal;
    a fourth multiplexer for communicating the output of the second multiplexer to a second one of the plurality of data registers according to the control signal; and
    a fifth multiplexer for communicating data from one of the plurality of data registers to an output of the register array circuit according to the control signal.

10. A programmable element comprising:
    a crosspoint switch;
    an array of data registers including a first bank comprising a first plurality of registers and a second bank comprising a second plurality of registers;
    a host interface operable to receive data from a host;
    a control interface for receiving a control signal;
    a first multiplexer for receiving first data from the host interface and second data from the crosspoint switch, and for communicating one of the first data or the second data to an output of the first multiplexer according to the control signal;
    a second multiplexer for receiving the first data from the host interface and the second data from the crosspoint switch, and for communicating one of the first data or the second data to an output of the second multiplexer according to the control signal;
a third multiplexer for communicating the output of the first multiplexer to a register in the first bank of registers according to the control signal;
a fourth multiplexer for communicating the output of the second multiplexer to a register in the second bank of registers according to the control signal; and
a fifth multiplexer for receiving data from each of the registers and communicating data from one of the registers to the crosspoint switch according to the control signal.

11. A programmable element comprising:

a crosspoint switch;

an array of data registers including a first bank comprising a first plurality of registers and a second bank comprising a second plurality of registers;

a host interface for receiving data and a first control signal from a host;

a control interface for receiving a second control signal;

a first multiplexer for receiving first data from the host interface and second data from the crosspoint switch, and for communicating one of the first data or the second data to an output of the first multiplexer according to the first and second control signals;

a second multiplexer for receiving first data from the host interface and second data from the crosspoint switch, and for communicating one of the first data or the second data to an output of the second multiplexer according to the first and second control signals;

a third multiplexer for communicating the output of the first multiplexer to a register in the first bank of registers according to the first and second control signals;

a fourth multiplexer for communicating the output of the second multiplexer to a register in the second bank of registers according to the first and second control signals;

a fifth multiplexer for communicating data from one of the sixteen data registers to the crosspoint switch according the first and second control signals; and a control circuit for receiving and storing the first and second control signals, and for generating an error signal upon the occurrence of a predetermined error condition selected from the group consisting of data in a register being overwritten and lack of data input to the register.

12. The programmable element of claim 3, wherein the error condition includes data in a register being overwritten.

13. The programmable element of claim 3, wherein the error condition includes lack of data input to a register.

* * * * *